United States Patent [19]
Yanagita et al.

[11] Patent Number: 5,877,504
[45] Date of Patent: Mar. 2, 1999

[54] RADIOGRAPHIC INTENSIFYING SCREEN AND RADIATION IMAGE CONVERTING PANEL

[75] Inventors: Takafumi Yanagita; Kouji Amitani, both of Hino, Japan

[73] Assignee: Konica Corporation, Tokyo, Japan

[21] Appl. No.: 855,914

[22] Filed: May 14, 1997

[30] Foreign Application Priority Data

May 20, 1996 [JP] Japan ................................ 8-124566

[51] Int. Cl.$^6$ ........................................... G21K 4/00
[52] U.S. Cl. ......................................................... 250/484.4
[58] Field of Search ............................. 250/483.1, 484.4

[56] References Cited

U.S. PATENT DOCUMENTS 4,472,635  9/1984  Yukota et al. ................. 250/483.1 X
4,910,407  3/1990  Arkakawa et al. ................. 250/484.4
5,164,224  11/1992  Kosima et al. ................. 250/484.4 X

FOREIGN PATENT DOCUMENTS 59-138999  8/1984  Japan ................................ 250/484.4

*Primary Examiner*—Edward J. Glick
*Attorney, Agent, or Firm*—Frishauf, Holtz, Goodman, Langer & Chick, P.C.

[57] ABSTRACT

A radiation image detective sheet is disclosed, comprising a support having thereon a luminescent substance layer containing particles of a luminescent substance dispersed in a binder, wherein a ratio of the binder to the luminescent substance contained in the luminescent substance layer is 0.1 to 3.0% by weight and a filling ratio of the phosphor in the phosphor layer is not less than 65%. Further disclosed are a radiographic intensifying screen and a radiation image converting panel containing a phosphor and a stimulable phosphor as the luminescent substance, respectively, each having the same structure as the radiation image detective sheet.

12 Claims, 1 Drawing Sheet

RADIOGRAPHIC INTENSIFYING SCREEN AND RADIATION IMAGE CONVERTING PANEL

FIELD OF THE INVENTION

The present invention relates to a radiation image detective sheet and in particular to a radiographic intensifying screen and radiation image converting panel, both having high image quality with respect to sharpness and graininess.

BACKGROUND OF THE INVENTION

Cited as a means for obtaining a radiographic image for medical diagnosis or non-destructive testing of a various types of tissues and applying it to diagnosis and radiographic flaw detection are: radiography by a combination of a silver halide photographic light sensitive material and a radiographic intensifying screen, or radiographic image conversion method by the use of a stimulable phosphor from which, after absorption of radiation energy, the accumulated radiation energy is emitted in the form of fluorescence by stimulation with electromagnetic waves such as visible light or infra-red rays (hereinafter referred to as stimulable phosphor).

Diagnosis or examination with radiography is such that radiation transmitted through or emitted from photographic object is converted, through absorption by phosphor contained in the radiographic intensifying screen and its excitation, into visible light, which produces a radiographic image on the silver halide photographic light sensitive material. The radiographic image is formed by exposing, to radiation through an object, the silver halide photographic light sensitive material having on one side or both sides of a support a silver halide emulsion layer, which is in contact with a radiographic intensifying screen to a radiation through an object.

The phosphor has a high brightness and can form a radiographic image with a relatively small dose of radiation, so that exposure to radiation of the object can be minimized. It is well known that sharpness and graininess of the image depend upon the particle size and dispersion of the phosphor, and homogeneity and in particular upon the filling ratio in a phosphor containing layer.

The radiographic image conversion method employing the stimulable phosphor includes the employment of a radiation image converting panel containing the stimulable phosphor (hereinafter, referred to as stimulable phosphor panel). In this case, the radiation transmitted through or emitted from the object is absorbed by a stimulable phosphor contained in the panel, followed by stimulating time-sequentially the phosphor with electromagnetic waves such as visible light and infra-red rays (also known as stimulating light), and emitting the radiation energy accumulated in the phosphor, in the form of light (photo-stimulated luminescence). The photo-stimulated luminescence is read as electric signals and based the electric signals obtained, the object or its radiographic image is reproduced as a visible image. The panel which has already been read is treated to eliminate residual images and made ready for the next photograph. Thus, the conversion panel can be repeatedly employed.

Similarly to the screen, brightness, image sharpness and granularity of the panel are also dependent upon the particle size, dispersibility, homogeneity and filling ratio of the stimulable phosphor. Of these, the filling ratio of the stimulable phosphor is particularly affectional.

There was proposed a technique of enhancing the filling ratio by compressing the phosphor containing layer or stimulable phosphor containing layer. The phosphor or stimulable phosphor has a disadvantage in that it is liable to produce defect or destruction of the crystal structure under pressure, resulting in lowering of the sensitivity. In order to keep the phosphor or stimulable phosphor from destruction, it must contain a large amount of resin, so that the proportion of the resin in the phosphor layer or stimulable phosphor layer increases and light is more easily diffused, leading to undesired lowering of the sharpness.

JP-A 3-196036 (herein, the expression "JP-A" refers to an unexamined and published Japanese Patent Application) discloses a technique of improving sharpness of the screen by controlling the weight ratio of the binder and the filling ratio of the phosphor, in which the weight ratio of the binder to the phosphor and the filling ratio of the phosphor are defined to be 4–11% and 60–70%, respectively.

The upper limit of the filling ratio of the phosphor being 70% is ascribed to a higher ratio of the weight ratio of the binder and the fact that an increase of the phosphor filling ratio rapidly reduces the void ratio by volume as a factor of light scattering and as a result, light is easily diffused, resulting in deterioration of image sharpness.

JP-A 3-196036 described above discloses a technique of enhancing the filling ratio by applying compression-heating. In this technique, the more the filling ratio is enhanced, the more severe the compression-heating condition is forced to be, causing destruction of the phosphor and denaturation of the binder and leading to lowering of the sensitivity. In view thereof, it can be understood that the phosphor filling ratio is at most, 70%.

Contrarily, if the weight ratio of the binder is decreased without applying a means such as compression-heating or with heating under low compression, the phosphor filling ratio can easily exceed its upper limit of 70%.

As described in JP-A 3-196036, when the weight ratio of the binder is less than 4%, strength of the intensifying screen is often markedly lowered; therefore, and further modification is required for maintaining the strength of the screen at a desired level, along with a lower weight ratio of the binder.

Inventors of the present invention found that an intensifying screen with sufficient strength even when the binder weight ratio was 0.1 to 3.0%, having a high filling ratio of the phosphor even without being compressed or with a little compression, and capable of providing an image with superior performance, could be obtained through selecting physical properties of the resin used as a binder, a solvent suitable therefor and a dispersing method and dispersing apparatus, and optimizing viscosity of a coating solution, dispersing power and dispersing time to thinly cover the surface of phosphor particles with a binder, thereby allowing the particles to closely approach to each other and forming a fine, soft and uniform network.

The above technique can be applied to the panel containing the stimulable phosphor.

SUMMARY OF THE INVENTION

It is an object of the present invention to provide a radiation image detective sheet superior in brightness, sharpness and graininess.

It is further an object to provide a radiographic intensifying screen and a radiation image converting panel which are each superior in brightness, sharpness and graininess.

The above object can be accomplished by the following constitutions.

1. A radiation image detective sheet comprising a support having thereon a luminescent substance layer containing particles of a luminescent substance dispersed in a binder, wherein a ratio of the binder to the luminescent substance contained in the luminescent substance layer is 0.1 to 3.0% by weight and a filling ratio of the luminescent substance in the luminescent substance layer is not less than 65%.

2. The radiation image detective sheet comprising a support having thereon a phosphor layer containing a luminescent substance dispersed in a binder as described in 1, wherein said luminescent substance comprises luminescent substance particles exhibiting the particle size distribution with two or more peaks including two main peaks A and B, which are at 0.5 to 5 $\mu$m and 6 to 30 $\mu$m, respectively; a difference in the particle size between peaks A and B being not less than 5 $\mu$m or the particle size of peak B being not less than 3 times that of peak A.

3. The radiation image detective sheet comprising a support having thereon a luminescent substance layer containing a luminescent substance dispersed in a binder as described in 2, wherein a ratio by weight of particles constituting peak A to those constituting peak B is between 5:95 to 80:20.

4. The radiation image detective sheet as described in 1 through 3, wherein said binder comprises a resin containing a hydrophilic polar group.

5. The radiation image detective sheet as described in 4, wherein said hydrophilic polar group is selected from the group consisting of —$SO_3M$, —$OSO_3M$, —COOM, —PO$(OM)_2$ and —OPO$(OM)_2$, in which M is a hydrogen atom or an alkali metal atom.

6. The radiation image detective sheet as described in 4 or 5, wherein the content of said hydrophilic polar group is $10^{-7}$ to $10^{-3}$ mol per g of the binder.

7. The radiation image detective sheet as described in 1 through 6, wherein the weight-averaged molecular weight of said resin is 5,000 to 200,000.

8. The radiation image detective sheet as described in 1 through 7, wherein said resin containing the hydrophilic polar group is a resin selected from the group consisting of polyurethanes, polyesters, polyvinyl chlorides, polyvinyl butyrals and nitrocelluloses.

9. The radiation image detective sheet as described in 1 through 8, wherein said radiation image detective sheet is a radiographic intensifying screen, said luminescent substance being a phosphor.

10. The radiation detective sheet as described in 1 through 8, wherein said radiation image detective sheet is a radiation image converting panel, said luminescent substance being a stimulable phosphor.

DETAILED DESCRIPTION OF THE INVENTION

Figure 1:
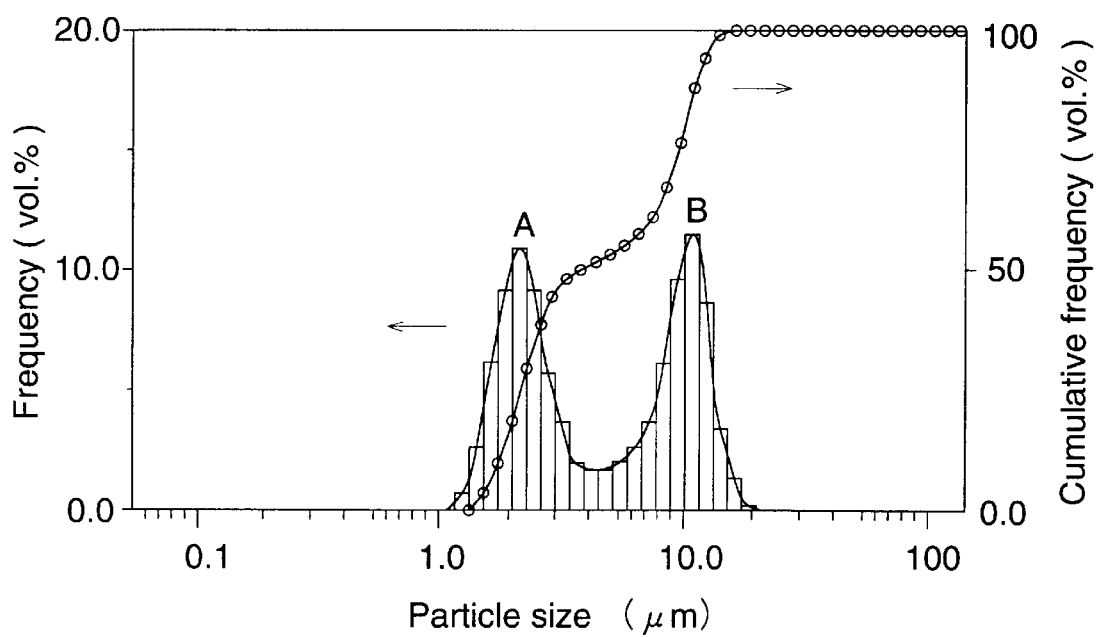
FIG. 1 illustrates size distribution of luminescent substance particles.

There is provided by the present invention a radiation image detective sheet comprising a support having thereon a luminescent substance layer which contains a luminescent substance and a binder. Herein, the luminescent substance is referred to as a material which is solid at ordinary temperature and ordinary pressure, and capable of exhibiting luminescence at ordinary temperature. In the invention, the luminescent substance is preferably phosphor or stimulable phosphor. Thus, there is provided, in one embodiment of the invention, a radiographic intensifying screen comprising a support having thereon a phosphor layer which contains a phosphor and a binder. There is further provided a radiation image converting panel comprising a support having thereon a phosphor layer which contains a stimulable phosphor and a binder. The binder is contained in an amount of 0.1 to 3.0% by weight, based on the luminescent substance (in particular, phosphor or stimulable phosphor) contained in the luminescent substance layer (or phosphor layer) and its capability of dispersing the phosphor is also enhanced. As a result, the binder covers thinly and uniformly the surface of particles of the luminescent substance and therefore, the particles are closely associated with each other, leading to enhancement of the filling ratio of the luminescent substance in the luminescent substance layer. Thus, the luminescent substance layer with a high filling ratio of the luminescent substance particles can be obtained without compressing or applying any other means.

The content of the binder in the luminescent substance layer is 0.1 to 3.0% by weight, based on the luminescent substance and the filling ratio of the luminescent substance is not less than 65%. Further, the content of the binder in the phosphor layer is 0.1 to 3.0% by weight, based on the phosphor or stimulable phosphor and the filling ratio of the phosphor or stimulable phosphor is not less than 65%.

The phosphor layer comprises particles of the phosphor (or stimulable phosphor), the binder and voids. The voids are spaces in the phosphor layer, in which substantially none of the phosphor particles and the binder are present. Accordingly, the proportion of the voids in the phosphor layer increases with a decrease of the binder. Since the voids act as a light-scattering factor, diffusion of light emitted from the phosphor or stimulable phosphor is reduced, resulting in enhanced sharpness.

In the case where the weight ratio of the binder to the phosphor (or stimulable phosphor) exceeds 3.0%, the voids in the phosphor layer decrease to decrease the light-scattering and the emitted light is easily diffused, resulting in deterioration of sharpness. In the case where the weight ratio of the binder is less than 0.1%, on the other hand, it is difficult for the binder to cover all surfaces of the particles of the phosphor or stimulable phosphor and to properly bind the phosphor or stimulable phosphor to each other. As a result, a phosphor or stimulable phosphor with a high filling ratio cannot be obtained. Furthermore, it is difficult for the binder to be uniformly present in the phosphor layer, causing the phosphor to be ununiform in the layer and resulting in ununiform emission which causes the image to be deteriorated. It is also not preferred since the phosphor layer becomes brittle and is easily scratched.

It is preferred that the luminescent substance usable in the radiation image detector (phosphor particles used in the screen or the panel) according to the invention comprise two or more distinct groups in size distribution and provide a particle size distribution curve having two or more peaks including main two peaks. One of the two main peaks (denoted as peak A) is preferably between 0.5 and 5 $\mu$m and the other one (denoted as peak B), between 6 and 30 $\mu$m; a difference in the particle size between peak A and peak B being not less than 5 $\mu$m or the particle size of peak B being not less than 3 times that of peak A. A ratio by volume of the phosphor particles constituting peak A to those constituting peak B is preferably between 5:95 and 80:20.

The distribution of luminescent substance particle sizes can be measured by use of a commercially available particle-size measuring apparatus (e.g., Laser scattering particle size analyzer LA-910, produced by Horiba Seisakusho), and the result thereof is exemplarily shown in FIG. 1, in which the particle size distribution based on volume can be represented as a histogram or curve. As can be seen therefrom, the size distribution curve has two peaks, in which a peak having a smaller particle size refers to peak A and the other one having a larger particle size refers to peak B. Thus, the particles are comprised of two distinctive groups in size distribution.

When a difference in size between peak A and peak B is not less than 5 μm or the particle size of peak B is not less than 3 times that of peak A, luminescent substance particles of peak A efficiently get in between luminescent substance particles of peak B, resulting in enhancement of the filling ratio of the total particles in the luminescent substance layer. Thus, the enhancement of the filling ratio leads to improved balance of sensitivity, sharpness and graininess. When the particle size of peak A is less than 0.5 μm, scattering rapidly increases, leading to lowering of sensitivity. On the contrary, when the particle size of peak B exceeds 30 μm, sharpness is markedly deteriorated.

In cases where the particle size distribution has more than two peaks, the two main peaks refer to a peak with the first largest peak height and a peak with the second largest peak height. Of these two main peaks, one having a smaller particle size refers to peak A and the other one having a larger particle size refers to peak B.

The luminescent substance particles were dispersed in water using an appropriate surfactant and subjected to the particle-size measurement, as described above, using a light scattering particle-size measuring apparatus (e.g., LA-910, produced by Horiba Seisakusho).

The ratio of the binder to the luminescent substance and the filling ratio of the luminescent substance in the luminescent substance layer can be determined according to the following manner. At first, a protective layer of the radiation image detective sheet is removed and then the luminescent substance layer is eluted from the detective sheet, using an organic solvent such as methyl ethyl ketone and dried to remove the solvent. The resulting mixture (M g) of the luminescent substance and binder is further burned at 600° C. for a period of 1 hr. to remove the binder and obtain the luminescent substance as residue (N g). The ratio of the binder to the luminescent substance and the filling ratio of luminescent substance each can be calculated based on the following formula:

Ratio of binder to luminescent substance=$[(M-N)/N]\times 100(\%)$

Filling ratio of luminescent substance=$[N/(P\times Q\times R)]\times 100(\%)$ wherein P is a thickness of the luminescent substance layer (cm), Q is an area of the detective sheet (cm$^2$) and R is a density of the luminescent substance (g/cm$^3$).

The proportion of each group of particles constituting each peak of the particle-size distribution can be determined from the particle-size distribution measured by the above-mentioned light scattering type particle-size measuring apparatus, based on peak ratio by volume. In cases where tails of two peaks overlap with each other, the peaks are separated by a mean value between particle sizes at each of the peaks and the proportion of each peak can be determined.

In the case of the phosphor used in the radiographic intensifying screen and the stimulable phosphor used in the radiation image converting panel, the particle size, the filling ratio of the stimulable phosphor and the proportion of each particle group can be determined in a manner similar to the above-mentioned luminescent substance.

A ratio by weight of the luminescent substance (in particular, phosphor or stimulable phosphor) particles constituting peak A to those constituting peak B is preferably in a range of 5:95 to 80:20, whereby the filling ratio is efficiently enhanced, leading to an improvement in image quality.

The function of the binder is to hold the phosphor particles in the phosphor layer. The binder includes resins as described below and hardening agent used for hardening the resin.

Examples of resins usable as a binder in the invention include polyurethane, polyester, vinyl chloride copolymer such as vinyl chloride-vinyl acetate copolymer, vinyl chloride-vinylidene chloride copolymer and vinyl chloride-acrylonitrile copolymer, butadiene-acrylonitrile copolymer, polyamide, polyvinyl butyral, cellulose derivatives (e.g., nitrocellulose), styrene-butadiene copolymer, synthetic rubbers, phenol resin, epoxy resin, urea resin, melamine resin, phenoxy resin, silicone resin, and urea-formaldehyde resin. Of these resins, polyurethane, polyester, vinyl chloride copolymer, polyvinyl butyral and nitrocellulose are preferred.

A weight-averaged molecular weight of the binder is preferably 5,000 to 200,000.

The binder usable in the invention is preferably a binder containing a hydrophilic polar group. In this case, the hydrophilic polar group improves dispersion of the phosphor particles, through its adsorption to the surface of the particles, leading to prevention of coagulation of the phosphor particles and enhancement of coating stability, sharpness and graininess. The resin containing a hydrophilic polar group according to the invention is one containing a hydrophilic polar group selected from the group consisting of —SO$_3$M, —OSO$_3$M, —COOM, —PO(OM)$_2$, and —OPO(OM)$_2$ (i.e., negative functional group), in which M is hydrogen atom or an alkali metal atom such as Li, K, Na.

As a preferred example of the resin containing the hydrophilic polar group, polyurethane is explained further in detail. Polyurethane can be synthesized through reaction of a polyol with a polyisocyanate which is generally employed. As a polyol component is generally used polyesterpolyol which can be obtained through reaction of the polyol with a polybasic acid. According to this known method, the polyesterpolyol containing the hydrophilic polar group can be synthesized by using the polybasic acid containing the hydrophilic polar group, as a part of the polybasic acid.

Examples of the polybasic acid include phthalic acid, isophthalic acid, terephthalic acid, adipic acid, azelaic acid, cebacic acid and maleic acid. Examples of the polyester-polyol containing the hydrophilic polar group include , 5-sulfo-isophthalic acid, 2-sulfoisophthalic acid, 4-sulfoisophthalic acid, 3-sulfoisophthalic acid, dialkyl 5-sulfoisophthalate, dialkyl 2-sulfoisophtalate, dialkyl 4-sulfoisophthalate, dialkyl 3-sulfoisophthalate and their sodium or potassium salt.

Examples of the polyol include trimethylol propane, hexanetriol, glycerin, trimethylolethane, neo-pentylglycol, pentaerythritol, ethylene glycol, propylene glycol, 1,3-butanediol, 1,4-butanediol, 1,6-hexanediol, diethylene glycol and cyclohexanedimethanol.

Polyester-polyols containing other hydrophilic polar groups can also be synthesized by a conventionally known method. The polyurethane can be prepared by using these polyesterpolyol as a raw material for the synthesis.

Examples of the polyisocyanate include diphenylmethane-4,4-diisocyanate (MDI), hexamethylene diisocyanate (HMDI), tolylene diisocyanate (TDI), 1,5- naphthalene diisocyanate (NDI), toluidine diisocyanate (TODI), lysine isocyanate methyl ester (LDI) and isopholonediisocyanate (IPDI).

As another method for synthesizing the polyurethane, it can be prepared through addition reaction of the following compound containing the hydrophilic polar group and a chlorine atom to a polyurethane containing a OH group.

ClCH$_2$CH$_2$SO$_3$M
ClCH$_2$CH$_2$OSO$_3$M
ClCH$_2$PO(OM)$_2$
CLCH$_2$COOM

Furthermore, there are also commercially available polyurethane containing —SO$_3$Na group, UR8300 (product by Toyobo Co. Ltd.) and polyurethane containing —COOH group. TIM-6001 (product by Sanyo Kasei Co. ltd.).

In addition to the resins above-described, the following resins are usable as a binder containing the hydrophilic polar group. Examples thereof are one having a weight-averaged molecular weight of 5,000 to 200,000, including a vinyl chloride copolymer, vinyl chloride-vinyl acetate copolymer, vinyl chloride-vinylidene chloride copolymer, butadiene-acrylonitrile copolymer, polyamide, poly(vinyl butylal), cellulose derivative (e.g., nitrocellulose), styrene-butadiene copolymer, a variety of synthetic rubber type resins, phenol resin, epoxy resin, urea resin, melamine resin, pheoxy resin, silicone resin, acryl type resin, urea-formamide resin. Among these are preferred a polyester, vinyl chloride type copolymer poly(vinyl butyral) and nitrocellulose.

The vinyl chloride type resin can be synthesized through addition reaction of the following compound containing a hydrophilic polar group and a chlorine atom to a copolymer containing a OH group such as vinyl chloride-vinyl alcohol copolymer.

ClCH$_2$CH$_2$SO$_3$M
ClCH$_2$CH$_2$OSO$_3$M
ClCH$_2$PO(OM)$_2$
ClCH$_2$COOM

In the case of ClCH$_2$CH$_2$SO$_3$Na, for example, it can be synthesized as follows:

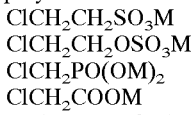 + n[ClCH$_2$CH$_2$SO$_3$Na] ⟶

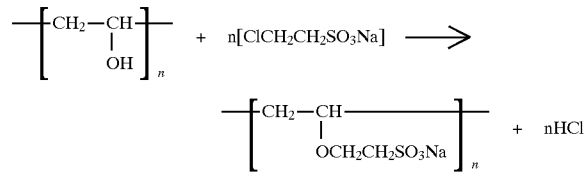 + nHCl

Alternatively, copolymerization can be done by using copolymerizable monomers. Thus, a reactive unsaturated monomer having a repeating unit with a hydrophilic polar group is introduced into a reaction vessel such as an autoclave with a given volume and polymerization can be done by using a conventional polymerization initiator including radical polymerization initiator such as benzoyl peroxide (BPO) and azobisisobutyronitrile (AIBN), redox polymerization initiator, anionic polymerization initiator and cationic polymerization initiator. Examples of the reactive monomer for introducing a sulfonic acid or its salt include unsaturated hydrocarbon sulfonic acids such as vinyl sulfonic acid, acrylsulfonic acid and p-styrenesulfonic acid and its salts. Furthermore, acryl or methacrylsulfoalkyl ester such as 2-acrylamido-2-methylpropanesulfonic acid, (metha)acrylsulfonic acid ethyl ester, (metha)acrylsulfonic acid propyl ester and their salts and ethyl 2-sulfoacrylate are cited.

In cases where a carboxylic acid or its salt (i.e. —COOM group) is introduced, (metha)acrylic acid or maleic acid may be usable. In cases where phosphoric acid or its salt is introduced, (metha)acrylic acid-2-phosphoric acid eater may be usable.

As examples of the vinyl chloride type copolymer is cited a compound represented by the following formula:

Formula (1)

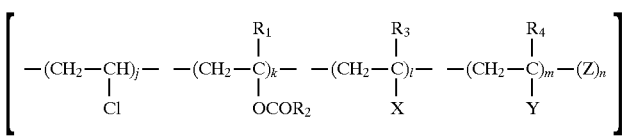

In the formula, $R_1$, $R_2$, $R_3$ and $R_4$ are each independently a hydrogen atom or an alkyl group having 1 to 4 carbon atoms (e.g., methyl, ethyl, propyl, butyl, etc.) and each of them may be the same as or different from each other in the repeating unit block, Y is a group having an hydrophilic polar group, i.e., —A—X$_0$; X is a substituent having an epoxy group such as

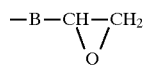

wherein A and B are a linkage group which has respectively an intramolecular base or epoxy group linked with the main chain of the copolymer, and the linkage group is as follows:

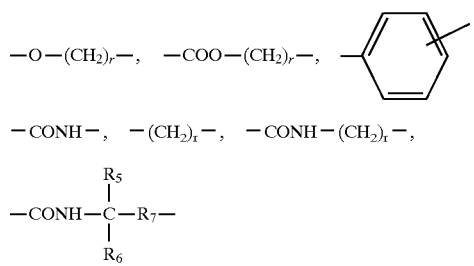

in the above, $R_5$ and $R_6$ are each a hydrogen atom, an alkyl group having 1 to 15 carbon atoms or a phenyl group; $R_7$ is an alkylene group having 1 to 15 carbon atoms, and r is an integer of 0 to 20; $X_0$ is a hydrophilic polar group; and Z represents a repeating unit, which is optionally introduced for the purpose of modifying characteristics of modified vinyl chloride type copolymer.

In formula (1), k is 200 to 800, l is 1 to 100, m is 1 to 100 and n is 0 to 200.

Next, synthesis of the vinyl chloride type copolymer used in the screen and panel of the invention will be explained.

A given amount of a reactive monomer with an unsaturated bond from which the repeating unit represented by formula (1) is derived, is introduced into a reaction vessel such as an autoclave and polymerization can be proceeded by the use of a conventional polymerization initiator including a radical polymerization initiator such as benzoyl peroxide (BPO),or an anion polymerization initiator and cation polymerization initiator azobisisobutylonitrile (AIBN). Thereafter, the resulting polymer is dried and optionally further subjected to a treatment such as pulverization to obtain a final product mainly in the form of white powder.

In general, polyesters can be prepared through condensation reaction of an aliphatic or aromatic polybasic acid( or its derivative) with an aliphatic or aromatic polyol. The hydrophilic polar group may be contained either in the acid component or alcohol component. Alternatively, it may be introduced through polymerization reaction. Preferably, the hydrophilic polar group is contained in the polymerizing monomer, in terms of unreacted components and introducing yield.

Further, the hydrophilic polar group can be introduced through polymerization reaction, i.e., by having a compound having a hydrophilic polar group reacted with OH groups at the terminal position or in the side chain of a polyurethane, polyester, polyvinyl chloride, polyvinyl butylal or nitrocellulose, of which chain length is previously extended to a given extent through polymerization. In this case, a compound having a OH group and hydrophilic polar group is initially synthesized. Then this compound is reacted with equimolar amount of a polyisocyanate compound such as a diisocyanate to obtain a reaction product of one NCO group of, e.g., diisocyanate and the above compound having a OH group. Further, through reacting unreacted NCO groups with OH groups present in the main chain or side-chain of the resin described above is obtained a resin into which the hydrophilic polar group has been introduce.

As commercially available products of these compounds are cited, for example, vinyl chloride-vinyl acetate copolymer containing —$SO_3K$ group, MR110 (produced by Nihon Zeon Co. Ltd.) and polyester containing —$SO_3Na$ group, Biron 280 (produced by Toyobo Co. Ltd.).

The hydrophilic polar group can be identified by means of, e.g., NMR (Nuclear Magnetic Resonance) and quantitatively determined by wavelength-dispersion type fluorescent X-ray analysis (WDX). As an exemplary means of measuring the content of the hydrophilic polar group, the content of an $SO_3M$ group can be determined according to the following manner. Various amounts of sulfur (S) at a purity of 99.9999% are added to a matrix resin, with a given amount of a phosphorus (P)-containing compound as an internal standard material. Fluorescent X-ray intensities of S to P are measured with respect to each sample by the WDX to prepare a calibration curve for the content of sulfur. Next, to a sample is added a given amount of P-containing compound, which was subjected to WDX analysis to determine the P-content.

The content of the hydrophilic polar group is preferably $10^{-7}$ to $10^{-3}$ and more preferably $10^{-7}$ to $10^{-4}$ mol per gram of the binder contained in the phosphor or stimulable phosphor layer.

A resin not containing a hydrophilic polar group may be contained in the binder. Examples of the resin are one having a weight-averaged molecular weight of 5,000 to 200,000, including urethane-vinyl chloride copolymer, vinyl chloride-vinyl acetate copolymer, vinyl chloride-vinylidene chloride copolymer, vinyl chloride-acrylonitrile copolymer, butadiene-acrylonitrile copolymer, polyamide, polyvinyl butyral, cellulose derivative (e.g., nitrocellulose), styrene-butadiene copolymer, a variety of types of synthetic rubber resin, phenol resin, epoxy resin, urea resin, melamine resin, phenoxy resin, silicone resin, acryl resin and urea-formamide resin. Among these, polyurethane-polyester, vinyl chloride type copolymer, polyvinyl butyral and nitrocellulose are preferably used. In this case, the content of the hydrophilic polar group is also preferably $10^{-7}$ to $10^{-3}$ mol per gram of the binder contained in the phosphor or stimulable phosphor layer.

Examples of the phosphors preferably usable in the radiographic intensifying screen of the invention include the following: tungstate phosphor (e.g., $CaWO_4$, $MgWO_4$, $CaWO_4$:Pb, etc.); terbium activated rare earth sulfide phosphor (e.g., $Y_2O_2S$:Tb, $Gd_2O_2S$:Tb, $La_2O_2S$:Tb, $(Y,Gd)_2O_2S$:Tb, $(Y,Gd)_2O_2S$:Tb,Tm, etc.); terbium activated rare earth phosphate phosphor (e.g.,$YPO_4$:Tb, $GdPO_4$:Tb, $LaPO_4$:Tb, etc.); terbium activated rare earth oxyhalide phosphor (e.g.,LaOBr:Tb, LaOBr:Tb,Tm, LaOCl:Tb, LaOCl:Tb,Tm, LaOCl:Tb,Tm, LaOBr:Tb, GdOBr:Tb, GdOCl:Tb, etc.); thulium activated rare earth oxyhalide phosphor (e.g., LaOBr:Tm, LaOCl:Tm, etc.); barium sulfate phosphor (e.g., $BaSO_4$:Pb, $BaSO_4$:$Eu^{2+}$, $(Ba,Sr)SO_4$:$Eu^{2+}$, etc.); bivalent europium activated alkali earth phosphate phosphor [e.g., $(Ba_2PO_4)_2$:$Eu^{2+}$, $(Ba_2PO_4)_2$:$Eu^{2+}$, etc.]; bivalent europium activated alkali earth metal fluorohalide phosphor [e.g.,$BaFCl$:$Eu^{2+}$, $BaFBr$:$Eu^{2+}$, $BaFCl$:$Eu^{2+}$.Tb, $BaFBr$:$Eu^{2+}$.Tb, $BaF_2BaClKCl$:$Eu^{2+}$, $(Ba,Mg)F_2BaClKCl$:$E^{2+}$ etc.];iodide phosphor (e.g., CsI:Na, CsI:Tl, NaI, KI:Tl, etc.); sulfide phosphor [e.g., ZnS:Ag, (Zn,Cd)S:Ag, (Zn,Cd)S:Cu, (Zn,Cd)S:Cu.Al, etc.]; hafnium phosphate phosphor (e.g., $HfP_2O_7$:Cu, etc.); tantalate phosphor e.g., $YTaO_4$, $YTaO_4$:Tm, $YTaO_4$:Nb, $[Y,Sr]TaO_{4-x}$:Nb, $LuTaO_4$, $LuTaO_4$:Nb, $(Lu,Sr)TaO_{4-x}$:Nb, $GdTaO_4$:Tm, $Gd_2O_3TaO_4$:Tm, $Gd_2O_3Ta_2O_5B_2O_3$:Tb, etc.]. However, phosphors usable in the invention are not to these compounds. Any phosphor capable of emitting visible or near-ultra violet light upon exposure to radiation, can be used.

Examples of the stimulable phosphors preferably usable in the radiation image converting panel according to the invention include the following: alkali earth metal halide phosphor (e.g., BaFBr:Eu, BaFI:Eu, $BaFBr_{1-x}I_x$:Eu, BaFCl:Eu, BaFBr:Ce, BaBrI:Eu, BaBrClEu, SrFBr:Eu, $BaBr_2$:Eu etc.); alkali metal halide phosphor (e.g., RbBr:Tl, RbI:Tl, CsI:Na, RbBr:Eu, RbI:Eu, CsI:Eu, etc.); sulfide phosphor (e.g., SrS:Ce,Sm, SrS:Eu,Sm, CaS:Eu,Sm, etc.); barium aluminate phosphor (e.g., $BaO.xAl_2O_3$:Eu, etc.); alkali earth metal silicate phosphor (e.g., $MgO.xSiO_2$, etc.), rare earth oxyhalide phosphor (e.g., LaOBr:Bi, Tb,Pr, etc.); and phosphate phosphor [e.g., $(3Ca_3(PO_4)_2CaF_2$:Eu, etc.). However, the stimulaable phosphor used according to the invention is not limited to these compound. There may be usable any phosphor which, after absorbing radiation energy, is capable of emitting the accumulated radiation energy in the form of fluorescence (stimulated luminescence), through stimulating with visible light or infrared rays (stimulating light).

As to a method for preparing the radiographic intensifying screen or radiation image converting panel, first one is that a coating solution of comprised of a binder and phosphor ,or a coating solution comprised of a binder and stimulable phosphor (hereinafter referred to as a phosphor coating solution or stimulable phosphor coating solution) is coated on a support to form a phosphor layer.

A second one is that a sheet comprised of the binder and phosphor, or the binder and stimulable phosphor is formed and then put onto the support, followed by a process of adhesion to the support at not lower than a softening or melting temperature of the binder.

As a method for forming the phosphor layer on the support are cited the above two types of methods. However, any method whereby the phosphor layer is uniformly formed on the support, may be adopted. Impingement coating may be usable.

In the first preparing method, the phosphor layer is formed by coating the coating solution in which the phosphor or stimulable phosphor is homogeneously dispersed in a binder, on the support and drying it.

In the second preparing method, on the other hand, the phosphor sheet which is to form the phosphor layer is prepared by temporarily coating the phosphor coating solution or stimulable phosphor coating solution on a support or subbed support and drying, followed by peeling the layer off from the support. Thus, the binder and the phosphor or stimulable phophor particles are added in an appropriate solvent and mixed with stirring by means of a disperser or a ball mill to form a coating solution in which the phosphor or stimulable phosphor is homogeneously dispersed in the binder.

Examples of the solvent for the coating solution include lower alcohols such as methanol, ethanol, n-propanol and n-butanol; chloro-containing hydrocarbons such as methylene chloride and ethylene chloride; ketones such as acetone, methyl ethyl ketone and methyl isobutyl ketone; cyclic hydrocarbon compounds such as toluene, benzene, cyclohexane, cyclohexanone and xylene; esters of a lower fatty acid and lower alcohol, such as methyl acetate, ethyl acetate and butyl acetate; and ethers such as dioxane, ethylene glycol monomethyl ester, ethylene glycol monoethyl ester.

The coating solution may contain a dispersing agent and plasticizer for the purpose of enhancement of dispersion of the phosphor or binding power between the binder and phosphor after forming the layer, respectively. Examples of the dispersing agent include phthalic acid, stearic acid, caproic acid and a hydrophobic surfactant. Examples of the plasticizer include phosphate esters such as triphenyl phosphate, tricresyl phosphate and diphenyl phosphate; phthalate esters such as diethyl phthalate and dimethoxyethyl phthalate; glycolate esters such as ethyl phthalylethyl glycolate and butyl phthalylbutyl glycolate; polyesters of polyethylene glycol and dibasic fatty acid, such as polyester of triethylene glycol and adipic acid and polyester of diethylene glycol and succinic acid.

The thus-prepared coating solution containing the phosph or stimulable phosphor and the binder is uniformly coated on the temporary support to form a coating layer of the coating solution. A means for coating is, for example, a doctor blade, roll coater, knife-coater, extrusion coater and so forth.

Support or temporary support made of glass, wool, cotton, paper or metal may be usable and those which are capable of being converted in the form of flexible sheet or roll are preferred in terms of handleability as information recording material. In view thereof are preferred plastic films such as cellulose acetate film, polyester film, polyethylene terephthalate film, polyamide film, polyimide film, triacetate film and polycarbonate film; metal sheets such as aluminum foil and aluminum alloy foil; and paper including paper for general use, paper for use in printing such as coated paper and art paper, photographic base paper such as baryta paper and resin-coated paper, paper sized with polysaccharide as described in Belgian Patent 784,615, pigment paper containing pigment such as titanium dioxide, and paper sized with poly(vinyl alcohol).

In the second preparing method, coat on a temporary support or subbed-support is peeled off from the support to form a phosphor layer sheet. Therefore, it is preferred that the surface of the support is previously coated with a releasing agent so that the phosphor layer is easily peelable.

To strengthen binding between the support and phosphor layer, a sub layer may be provided by coating polyester or gelatin on the surface of the support to enhance adhesion. There may be provided a light-reflecting layer comprised of light-reflecting material such as titanium dioxide or a light-absorbing layer comprised of light-absorbing material such as carbon black, for the purpose of enhancement of sensitivity and image quality (e.g., sharpness, graininess, etc.).

The phosphor layer according to the invention may be compressed. Compression of the phosphor layer leads to an increase of a filling density of the phosphor and improvements in sharpness and graininess. Compression can be made by the use of a pressing machine or calendering roll. In the case of the first preparing method, the phosphor and support are compressed together as such. In the case of the second preparing method, the obtained phosphor sheet is put on the support and compressed at not lower than a softening temperature or melting temperature of the binder to cause the phosphor sheet to adhere to the support. Thus, the phosphor sheet can be expanded to further thinner thickness by employing the method of compression-adhering, instead of previously fixing the sheet to the support.

Conventionally, the radiographic intensifying screen and the radiation image converting panel each have a transparent protective layer provided on the surface of the phosphor layer for physical and chemical protection thereof. In the invention, the transparent protective layer is preferably provided. The thickness thereof is in general within a range of 2 to 20 $\mu$m.

The protective layer can be formed by coating, on the surface of the phosphor layer, a solution prepared by dissolving in an appropriate solvent a cellulose derivative such as cellulose acetate or nitrocellulose, or a synthetic polymer material such as polymethyl methaacrylate, polyethylene terephthalate, poly(vinyl butyral), poly(vinyl formal), polycarbonate, poly(vinyl acetate), copoly(vinyl chloride•vinyl acetate). These polymer materials may be used singly or in combination thereof. In cases when coating the protective layer, a cross-linking agent may be added thereto immediately before coating. The protective layer may be formed by adhering a sheet comprised of poly(ethylene terephthalate), poly(ethylene naphthalate), polyethylene, poly(vinylidene chloride) or polyamide with an adhesive.

The protective layer according to the invention is preferably formed with a coating layer containing an organic solvent-soluble fluoro resin. The fluoro resin is referred to as fluorine containing olefin (i.e., fluoroolefin) polymer or copolymer having as a copolymerizing component a fluorine containing olefin. The protective layer formed of fluoro resin coating may be cross-linked. The fluoro resin coating protective layer has such an advantage that stain due to fat resulted from touching with hands or photographic materials, or due to plasticizer bled out of the photographic material is not liable to penetrate into the internal portion of the protective layer, so that the stain can easily be wiped off. The fluoro resin may be used in combination with another polymer material for the purpose of improving layer strength.

The protective layer is preferably a transparent synthetic resin layer with a thickness of 10 $\mu$m or less and provided on the phosphor layer. The use of such a thin protective layer, particularly in the case of the intensifying screen, shortens the distance from the phosphor to a silver halide emulsion layer, contributing to improvement in sharpness of the resulting radiographic image.

EXAMPLES

Embodiments of the present invention are explained more in detail based on examples, but the invention is not limited to these examples.

Example 1

Preparation of single phosphor type radiographic intensifying screen:

As a binder, polyurethane A to M, polyester A to F, polyvinyl chloride A to F, and polyvinyl butyral A to F as shown in Table 1 were each added to phosphor $Gd_2O_2S$:Tb (av. particle size 4.2 $\mu$m), and further thereto, a mixed solvent of methyl ethyl ketone and toluene (in a ratio of 1:1.15) was added so as to have a viscosity of 22 Ps with stirring by a ball mill for 6 hrs. to obtain a coating solution of the phosphor. Next, on a white polyethylene terephthalate support containing titanium dioxide (thickness of 250 $\mu$m) horizontally set on a glass plate, the above coating solution was coated by use of a knife-coater so as to have 150 $\mu$m of a dry thickness of the phosphor layer and dried to form a phosphor layer. After forming the phosphor layer, a polyester type adhesive was coated on one side of a polyethylene terephthalate film with thickness of 9 $\mu$m and the adhesive side thereof was brought into contact with the phosphor layer side to provide a protective layer. Thus, radiographic intensifying screen samples were prepared, as shown in Table 1.

Evaluation of radiographic intensifying screen a) Measurement of phosphor particle size distribution:

Phosphor particles were dispersed in water using a surfactant RE-610 (product by Toho Kagaku) and subjected to particle size measurement to determine the particle size distribution, using laser scattering particle-size analyzer LA-910 (product by Horiba Seisakusho). The particle size distribution was determined based on volume distribution.

b) Ratio of binder to phosphor and Filling ratio of phosphor:

A protective layer of the screen was peeled off and a phosphor layer was eluted from the screen with methylethylketone, and a filling ratio of a phosphor and a ratio of a binder to a phosphor were measured according to the manner afore-mentioned.

c) Brightness:

Screen samples each were cut out in a piece of 1×1 cm and sample pieces were each exposed to X ray (tube voltage of 80 kVp, tube current of 50 mA and exposure time of 0.1 sec.). Emission produced was condensed with an optical fiber and photoelectrically transferred through a photomultiplier and brightness was measured. The brightness was shown as a relative value, based on the brightness of screen Sample 17 being 100.

d) Sharpness:

Using the screen samples and a X-ray photographic film SR-G (produced by Konica Corp.), a square wave chart of Funk test chart SMS-5853 (commercially available from Konica Medical Corp.) was photographed. Processing thereof was conducted at a developing temperature of 35° C. and fixing temperature of 33° C. for a total processing time of 45 sec., using an automatic processor SRX-502 (produced by Konica Corp.) and processing solution SR-DF (produced by Konica Corp.). A MTF value of each sample was measured based on the contrast method. The MTF value was represented in terms of a value at a spatial frequency of 2.0 cycles/mm. Thus, the MTF value is the more, the sharpness is the better.

e) Evaluation of graininess:

Using the radiographic intensifying screen sample and X-ray film (SR-G), exposure to X-ray at 80 kVp was made at a distance so as to give a density 1.0±0.1. Processing was conducted in the same manner as in above (a). Graininess was evaluated based on RMS granularity measured at an aperture of 48 $\mu$m The RMS granularity is described in T. H. James, "The Theory of the Photographic Process", pages 619–620 (1977, published by Macmillan). The smaller the RMS value is, the better graininess is.

Results thereof are shown in Table 1.

TABLE 1

| Sample No. | Screen No. | Binder Resin | Binder Polar group | (mol/g) | Binder/Phosphor (%) | Filling ratio(%) | Brightness | Sharpness (MTF) | Graininess (RMS) | Remarks |
|---|---|---|---|---|---|---|---|---|---|---|
| 1 | 1 | Polyurethane A | —SO$_3$Na | $8.0 \times 10^{-7}$ | 1.5 | 68 | 105 | 0.41 | 0.013 | Inv. |
| 2 | 2 | Polyurethane B | —SO$_3$Na | $5.3 \times 10^{-5}$ | 1.5 | 76 | 115 | 0.44 | 0.012 | Inv. |
| 3 | 3 | Polyurethane B | —SO$_3$Na | $5.3 \times 10^{-5}$ | 2.5 | 71 | 112 | 0.39 | 0.013 | Inv. |
| 4 | 4 | Polyurethane B | —SO$_3$Na | $5.3 \times 10^{-5}$ | 4.0 | 64 | 105 | 0.32 | 0.016 | Comp. |
| 5 | 5 | Polyurethane B | —SO$_3$Na | $5.3 \times 10^{-5}$ | 0.5 | 73 | 108 | 0.45 | 0.013 | Inv. |
| 6 | 6 | Polyurethane B | —SO$_3$Na | $5.3 \times 10^{-5}$ | 0.05 | 56 | 90 | 0.32 | 0.026 | Comp. |
| 7 | 7 | Polyurethane C | —SO$_3$Na | $2.0 \times 10^{-4}$ | 1.5 | 72 | 113 | 0.43 | 0.012 | Inv. |
| 8 | 8 | Polyurethane D | —SO$_3$Na | $9.3 \times 10^{-4}$ | 1.5 | 71 | 110 | 0.42 | 0.013 | Inv. |
| 9 | 9 | Polyurethane E | —SO$_3$Na | $2.0 \times 10^{-3}$ | 1.5 | 68 | 102 | 0.39 | 0.016 | Inv. |
| 10 | 10 | Polyurethane F | —SO$_3$H | $5.3 \times 10^{-5}$ | 1.5 | 72 | 113 | 0.43 | 0.013 | Inv. |
| 11 | 11 | Polyurethane G | —SO$_3$Li | $5.3 \times 10^{-5}$ | 1.5 | 73 | 112 | 0.43 | 0.013 | Inv. |
| 12 | 12 | Polyurethane H | —SO$_3$K | $5.3 \times 10^{-5}$ | 1.5 | 76 | 115 | 0.44 | 0.013 | Inv. |
| 13 | 13 | Polyurethane I | —OSO$_3$Na | $5.3 \times 10^{-5}$ | 1.5 | 75 | 114 | 0.41 | 0.015 | Inv. |
| 14 | 14 | Polyurethane J | —COOH | $5.3 \times 10^{-5}$ | 1.5 | 71 | 113 | 0.40 | 0.014 | Inv. |
| 15 | 15 | Polyurethane K | —PO(OH)$_2$ | $5.3 \times 10^{-5}$ | 1.5 | 71 | 113 | 0.40 | 0.014 | Inv. |
| 16 | 16 | Polyurethane L | —OPO(OH)$_2$ | $5.3 \times 10^{-5}$ | 1.5 | 71 | 113 | 0.41 | 0.018 | Inv. |
| 17 | 17 | Polyurethane M | — | 0 | 1.5 | 61 | 100 | 0.31 | 0.015 | Comp. |
| 18 | 18 | Polyester A | —SO$_3$Na | $5.3 \times 10^{-5}$ | 1.5 | 76 | 114 | 0.43 | 0.013 | Inv. |
| 19 | 19 | Polyester B | —OSO$_3$Na | $5.3 \times 10^{-5}$ | 1.5 | 73 | 113 | 0.42 | 0.014 | Inv. |
| 20 | 20 | Polyester C | —COOH | $5.3 \times 10^{-5}$ | 1.5 | 69 | 110 | 0.40 | 0.015 | Inv. |
| 21 | 21 | Polyester D | —PO(OH)$_2$ | $5.3 \times 10^{-5}$ | 1.5 | 71 | 112 | 0.41 | 0.014 | Inv. |
| 22 | 22 | Polyester E | —OPO(OH)$_2$ | $5.3 \times 10^{-5}$ | 1.5 | 69 | 110 | 0.41 | 0.015 | Inv. |
| 23 | 23 | Polyester F | — | 0 | 1.5 | 66 | 106 | 0.37 | 0.016 | Inv. |
| 24 | 24 | Polyvinyl chloride A | —SO$_3$Na | $5.3 \times 10^{-5}$ | 1.5 | 75 | 112 | 0.43 | 0.013 | Inv. |
| 25 | 25 | Polyvinyl chloride B | —OSO$_3$Na | $5.3 \times 10^{-5}$ | 1.5 | 72 | 112 | 0.42 | 0.014 | Inv. |

TABLE 1-continued

| Sample No. | Screen No. | Binder Resin | Binder Polar group | (mol/g) | Binder/ Phosphor (%) | Filling ratio(%) | Brightness | Sharpness (MTF) | Graininess (RMS) | Remarks |
|---|---|---|---|---|---|---|---|---|---|---|
| 26 | 26 | Polyvinyl chloride C | —COOH | $5.3 \times 10^{-5}$ | 1.5 | 68 | 109 | 0.40 | 0.015 | Inv. |
| 27 | 27 | Polyvinyl chloride D | —PO(OH)$_2$ | $5.3 \times 10^{-5}$ | 1.5 | 71 | 109 | 0.41 | 0.015 | Inv. |
| 28 | 28 | Polyvinyl chloride E | —OPO(OH)$_2$ | $5.3 \times 10^{-5}$ | 1.5 | 71 | 109 | 0.41 | 0.016 | Inv. |
| 29 | 29 | Polyvinyl chloride F | — | 0 | 1.5 | 59 | 95 | 0.32 | 0.020 | Comp. |
| 30 | 30 | Polyvinyl butyral A | —SO$_3$Na | $5.3 \times 10^{-5}$ | 1.5 | 72 | 110 | 0.41 | 0.013 | Inv. |
| 31 | 31 | Polyvinyl butyral B | —OSO$_3$Na | $5.3 \times 10^{-5}$ | 1.5 | 71 | 108 | 0.41 | 0.014 | Inv. |
| 32 | 32 | Polyvinyl butyral C | —COOH | $5.3 \times 10^{-5}$ | 1.5 | 68 | 105 | 0.38 | 0.016 | Inv. |
| 33 | 33 | Polyvinyl butyral D | —PO(OH)$_2$ | $5.3 \times 10^{-5}$ | 1.5 | 69 | 106 | 0.40 | 0.014 | Inv. |
| 34 | 34 | Polyvinyl butyral E | —OPO(OH)$_2$ | $5.3 \times 10^{-5}$ | 1.5 | 68 | 106 | 0.38 | 0.014 | Inv. |
| 35 | 35 | Polyvinyl butyral F | — | 0 | 1.5 | 67 | 109 | 0.36 | 0.015 | Inv. |

As can be seen from Tables 1, radiographic intensifying screen samples according to the invention were shown to be superior to comparative samples, taking account of brightness, sharpness and graininess in combination.

Example 2
Preparation of mixed phosphor type radiographic intensifying screen

Gd$_2$O$_2$S:Tb phosphors were mixed with a binder, such as polyurethane B, I to M as shown in Table 2, and intensifying screen samples were prepared in a manner similar to Example 1. A ratio of binder to phosphor and a filling ratio of the phosphor were determined in a manner similar to Example 1.

Furthermore, the phosphor used in each sample was subjected to particle size measurement in a manner similar to Example 1. The phosphor particles used in each sample exhibited a particle size distribution having two peaks (peak-A and B), as shown in Table 2, that is, the phosphor particles of each sample was shown to be comprised of two distictive groups in size distribution. A ratio by weight of the phosphor particle group corresponding to the peak-B to those corresponding to the peak-A (denoted as B/A) was determined from the particle size distribution thereof, based on each peak area. In cases where tails of the two peaks overlap with each other, the peaks are separated by a midpoint between the two peak values and thus, the proportion of each peak can be determined.

Evaluation of the screen

The screen samples were evaluated in the same manner as in Example 1. Results thereof were shown in Table 2.

TABLE 2

| Sample No. | Screen No. | Phosphor Peak-B (μm) | Phosphor Peak-A (μm) | B/A | Binder Resin | Binder Polar group | (mol/g) | Binder/ Phosphor (%) | Filling ratio (%) | Brightness | Sharpness (MTF) | Graininess (RMS) | Remarks |
|---|---|---|---|---|---|---|---|---|---|---|---|---|---|
| 36 | 36 | 10.5 | 3.0 | 78/22 | Polyurethane B | —SO$_3$Na | $5.3 \times 10^{-5}$ | 1.5 | 79 | 126 | 0.42 | 0.011 | Inv. |
| 37 | 37 | 10.5 | 1.1 | 78/22 | Polyurethane B | —SO$_3$Na | $5.3 \times 10^{-5}$ | 1.5 | 81 | 122 | 0.42 | 0.01 | Inv. |
| 38 | 38 | 7.3 | 1.1 | 78/22 | Polyurethane B | —SO$_3$Na | $5.3 \times 10^{-5}$ | 1.5 | 80 | 116 | 0.46 | 0.01 | Inv. |
| 39 | 39 | 18.2 | 1.1 | 78/22 | Polyurethane B | —SO$_3$Na | $5.3 \times 10^{-5}$ | 1.5 | 78 | 129 | 0.44 | 0.012 | Inv. |
| 40 | 40 | 25.8 | 1.1 | 78/22 | Polyurethane B | —SO$_3$Na | $5.3 \times 10^{-5}$ | 1.5 | 79 | 145 | 0.37 | 0.013 | Inv. |
| 41 | 41 | 10.5 | 1.1 | 78/22 | Polyurethane B | —SO$_3$Na | $5.3 \times 10^{-5}$ | 1.5 | 82 | 118 | 0.45 | 0.011 | Inv. |
| 42 | 42 | 10.5 | 1.1 | 92/8 | Polyurethane B | —SO$_3$Na | $5.3 \times 10^{-5}$ | 1.5 | 78 | 125 | 0.41 | 0.013 | Inv. |
| 43 | 43 | 10.5 | 1.1 | 78/22 | Polyurethane I | —OSO$_3$Na | $5.3 \times 10^{-5}$ | 1.5 | 78 | 119 | 0.43 | 0.012 | Inv. |
| 44 | 44 | 10.5 | 1.1 | 78/22 | Polyurethane J | —COOH | $5.3 \times 10^{-5}$ | 1.5 | 76 | 118 | 0.42 | 0.013 | Inv. |
| 45 | 45 | 10.5 | 1.1 | 78/22 | Polyurethane K | —PO(OH)$_2$ | $5.3 \times 10^{-5}$ | 1.5 | 78 | 120 | 0.42 | 0.012 | Inv. |

TABLE 2-continued

| Sample No. | Screen No. | Phosphor Peak-B (μm) | Phosphor Peak-A (μm) | B/A | Binder Resin | Binder Polar group | (mol/g) | Binder/ Phosphor (%) | Filling ratio (%) | Brightness | Sharpness (MTF) | Graininess (RMS) | Remarks |
|---|---|---|---|---|---|---|---|---|---|---|---|---|---|
| 46 | 46 | 10.5 | 1.1 | 78/22 | Polyurethane L | —OPO(OH)$_2$ | $5.3 \times 10^{-5}$ | 1.5 | 79 | 118 | 0.41 | 0.012 | Inv. |
| 47 | 47 | 10.5 | 0.3 | 78/22 | Polyurethane B | —SO$_3$Na | $5.3 \times 10^{-5}$ | 1.5 | 78 | 103 | 0.42 | 0.013 | Inv. |
| 48 | 48 | 10.5 | 4.2 | 78/22 | Polyurethane B | —SO$_3$Na | $5.3 \times 10^{-5}$ | 1.5 | 69 | 124 | 0.36 | 0.012 | Inv. |
| 49 | 49 | 5.2 | 1.1 | 78/22 | Polyurethane B | —SO$_3$Na | $5.3 \times 10^{-5}$ | 1.5 | 68 | 109 | 0.41 | 0.013 | Inv. |
| 50 | 50 | 35.6 | 1.1 | 78/22 | Polyurethane B | —SO$_3$Na | $5.3 \times 10^{-5}$ | 1.5 | 79 | 143 | 0.34 | 0.012 | Inv. |
| 51 | 51 | 10.5 | 1.1 | 27/73 | Polyurethane B | —SO$_3$Na | $5.3 \times 10^{-5}$ | 1.5 | 72 | 114 | 0.37 | 0.013 | Inv. |
| 52 | 52 | 10.5 | 1.1 | 98/2 | Polyurethane B | —SO$_3$Na | $5.3 \times 10^{-5}$ | 1.5 | 68 | 109 | 0.39 | 0.012 | Inv. |
| 53 | 53 | 10.5 | 1.1 | 10/90 | Polyurethane B | —SO$_3$Na | $5.3 \times 10^{-5}$ | 1.5 | 68 | 105 | 0.37 | 0.015 | Inv. |
| 54 | 54 | 7.2 | 4.2 | 78/22 | Polyurethane B | —SO$_3$Na | $5.3 \times 10^{-5}$ | 1.5 | 70 | 112 | 0.40 | 0.013 | Inv. |
| 55 | 55 | 10.5 | 1.1 | 78/22 | Polyurethane M | — | 0 | 1.5 | 63 | 105 | 0.30 | 0.015 | Comp. |

As can be seen from Table 2, radiographic intensifying screen samples according to the invention were shown to be superior to comparative samples, taking account of brightness, sharpness and graininess.

Example 3

Preparation of single phosphor type radiation image converting panel:

To BaFBr:Eu (av. particle size 4.4 μm), binder, polyurethane A to M, polyester A to F, polyvinyl chloride A to F, and polyvinyl butyral A to F as shown in Table 3 were each added, and further thereto, a mixed solvent of methyl ethyl ketone and toluene (in a ratio of 1:1.22) was added so as to have a viscosity of 23 Ps with stirring by a ball mill for 6 hrs. to obtain a coating solution of a stimulable phosphor. Next, on a white polyethylene terephthalate support containing titanium dioxide (thickness of 250 μm) horizontally set on a glass plate, the above coating solution was coated by use of a knife-coater so as to have 250 μm of a dry thickness of the stimulable phosphor layer and dried to form a stimulable phosphor layer. After forming the phosphor layer, a polyester type adhesive was coated on one side of a polyethylene terephthalate film with thickness of 9 μm and the adhesive side thereof was brought into contact with the phosphor layer side to provide a protective layer. Thus, radiation image converting panel samples were prepared, as shown in Table 3.

Evaluation of radiation image converting panel (1) Measurement of stimulable phosphor particle size distribution:

Stimulable phosphor particles were dispersed in water using a surfactant RE-610 (product by Toho Kagaku) and subjected to particle size measurement to determine the particle size distribution, using laser scattering particle-size analyzer LA-910 (product by Horiba Seisakusho). The particle size distribution was determined based on volume distribution.

(2) Ratio of binder to phosphor and Filling ratio of phosphor:

A protective layer of the screen was peeled off and a phosphor layer was eluted from the screen with methylethylketone, and a filling ratio of the stimulable phosphor and a ratio of binder to stimulable phosphor were measured in the afore-mentioned manner.

(3) Brightness

Panel samples each were cut out in a piece of 1×1 cm and sample pieces were each exposed to X ray (tube voltage of 80 kVp, tube current of 50 mA and exposure time of 0.1 sec.) and excited by scanning with semiconductor laser light (oscillating wavelength of 680 nm and beam diameter of 100 μm). Stimulated emission was condensed with an optical fiber and photoelectrically transferred through a photomultiplier and brightness was measured. The brightness was shown as a relative value, based on the brightness of Sample 117 (Panel 17) being 100.

(4) Sharpness

A panel sample on which a CTF chart was affixed, was exposed to X-ray (tube voltage 80 kVp, tube current 50 mA) for 0.1 sec. at a distance of 1.5 m and excited by scanning with semiconductor laser light (oscillating wavelength of 680 nm and beam diameter of 100 μm). Then the stimulated emission emitted from the stimulable phosphor layer of the panel was read out through the CTF chart and photoelectrically transferred through a detector (photomultiplier) to obtain a signal. From the signal was determined the modulation transfer function (MTF) and sharpness of the image was evaluated according to the MTF. The MTF value was represented in terms of a value at a spatial frequency of 2.0 cycles/mm.

(5) Evaluation of graininess

A panel sample was exposed to X-ray (tube voltage 80 kVp, tube current 50 mA) for 0.1 sec. at a distance of 1.5 m and excited by scanning with semiconductor laser light (oscillating wavelength of 680 nm and beam diameter of 100 μm). Then the stimulated emission emitted from the stimulable phosphor layer of the panel was read out at a timing corresponding to a pitch of 25 μm and photoelectrically converted through a detector (photomultiplier) to obtain a signal. From the signal, the RMS granularity was determined and graininess was evaluated based on the RMS granularity. The RMS granularity is described in T. H. James, "The Theory of the Photographic Process", pages 619–620 (1977, published by Macmillan). The RMS value is the smaller, graininess is the better.

Results thereof were shown in Table 3.

TABLE 3

| Sample No. | Panel No. | Binder Resin | Binder Polar group | Binder Polar group (mol/g) | Binder/Phosphor (%) | Filling ratio(%) | Brightness | Sharpness (MTF) | Graininess (RMS) | Remarks |
|---|---|---|---|---|---|---|---|---|---|---|
| 101 | 1 | Polyurethane A | —SO$_3$Na | $8.0 \times 10^{-7}$ | 1.5 | 67 | 104 | 0.29 | 0.015 | Inv. |
| 102 | 2 | Polyurethane B | —SO$_3$Na | $5.3 \times 10^{-5}$ | 1.5 | 75 | 113 | 0.31 | 0.012 | Inv. |
| 103 | 3 | Polyurethane B | —SO$_3$Na | $5.3 \times 10^{-5}$ | 2.5 | 70 | 112 | 0.28 | 0.013 | Inv. |
| 104 | 4 | Polyurethane B | —SO$_3$Na | $5.3 \times 10^{-5}$ | 4.0 | 63 | 103 | 0.22 | 0.016 | Comp. |
| 105 | 5 | Polyurethane B | —SO$_3$Na | $5.3 \times 10^{-5}$ | 0.5 | 72 | 107 | 0.32 | 0.013 | Inv. |
| 106 | 6 | Polyurethane B | —SO$_3$Na | $5.3 \times 10^{-5}$ | 0.05 | 55 | 89 | 0.22 | 0.031 | Comp. |
| 107 | 7 | Polyurethane C | —SO$_3$Na | $2.0 \times 10^{-4}$ | 1.5 | 71 | 111 | 0.30 | 0.012 | Inv. |
| 108 | 8 | Polyurethane D | —SO$_3$Na | $9.3 \times 10^{-4}$ | 1.5 | 70 | 109 | 0.30 | 0.013 | Inv. |
| 109 | 9 | Polyurethane E | —SO$_3$Na | $2.0 \times 10^{-3}$ | 1.5 | 67 | 102 | 0.28 | 0.016 | Inv. |
| 110 | 10 | Polyurethane F | —SO$_3$H | $5.3 \times 10^{-5}$ | 1.5 | 71 | 112 | 0.30 | 0.013 | Inv. |
| 111 | 11 | Polyurethane G | —SO$_3$Li | $5.3 \times 10^{-5}$ | 1.5 | 72 | 112 | 0.30 | 0.013 | Inv. |
| 112 | 12 | Polyurethane H | —SO$_3$K | $5.3 \times 10^{-5}$ | 1.5 | 75 | 114 | 0.31 | 0.013 | Inv. |
| 113 | 13 | Polyurethane I | —OSO$_3$Na | $5.3 \times 10^{-5}$ | 1.5 | 74 | 114 | 0.29 | 0.015 | Inv. |
| 114 | 14 | Polyurethane J | —COOH | $5.3 \times 10^{-5}$ | 1.5 | 70 | 112 | 0.28 | 0.014 | Inv. |
| 115 | 15 | Polyurethane K | —PO(OH)$_2$ | $5.3 \times 10^{-5}$ | 1.5 | 70 | 113 | 0.28 | 0.014 | Inv. |
| 116 | 16 | Polyurethane L | —OPO(OH)$_2$ | $5.3 \times 10^{-5}$ | 1.5 | 70 | 111 | 0.29 | 0.018 | Inv. |
| 117 | 17 | Polyurethane M | — | 0 | 1.5 | 60 | 100 | 0.21 | 0.013 | Comp. |
| 118 | 18 | Polyester A | —SO$_3$Na | $5.3 \times 10^{-5}$ | 1.5 | 75 | 112 | 0.30 | 0.015 | Inv. |
| 119 | 19 | Polyester B | —OSO$_3$Na | $5.3 \times 10^{-5}$ | 1.5 | 72 | 113 | 0.29 | 0.017 | Inv. |
| 120 | 20 | Polyester C | —COOH | $5.3 \times 10^{-5}$ | 1.5 | 68 | 111 | 0.28 | 0.018 | Inv. |
| 121 | 21 | Polyester D | —PO(OH)$_2$ | $5.3 \times 10^{-5}$ | 1.5 | 70 | 112 | 0.29 | 0.017 | Inv. |
| 122 | 22 | Polyester E | —OPO(OH)$_2$ | $5.3 \times 10^{-5}$ | 1.5 | 69 | 108 | 0.29 | 0.018 | Inv. |
| 123 | 23 | Polyester F | — | 0 | 1.5 | 65 | 105 | 0.26 | 0.019 | Inv. |
| 124 | 24 | Polyvinyl chloride A | —SO$_3$Na | $5.3 \times 10^{-5}$ | 1.5 | 74 | 112 | 0.30 | 0.015 | Inv. |
| 125 | 25 | Polyvinyl chloride B | —OSO$_3$Na | $5.3 \times 10^{-5}$ | 1.5 | 71 | 110 | 0.29 | 0.016 | Inv. |
| 126 | 26 | Polyvinyl chloride C | —COOH | $5.3 \times 10^{-5}$ | 1.5 | 67 | 107 | 0.28 | 0.017 | Inv. |
| 127 | 27 | Polyvinyl chloride D | —PO(OH)$_2$ | $5.3 \times 10^{-5}$ | 1.5 | 70 | 108 | 0.29 | 0.017 | Inv. |
| 128 | 28 | Polyvinyl chloride E | —OPO(OH)$_2$ | $5.3 \times 10^{-5}$ | 1.5 | 70 | 109 | 0.29 | 0.019 | Inv. |
| 129 | 29 | Polyvinyl chloride F | — | 0 | 1.5 | 58 | 94 | 0.22 | 0.022 | Comp. |
| 130 | 30 | Polyvinyl butyral A | —SO$_3$Na | $5.3 \times 10^{-5}$ | 1.5 | 71 | 108 | 0.29 | 0.016 | Inv. |
| 131 | 31 | Polyvinyl butyral B | —OSO$_3$Na | $5.3 \times 10^{-5}$ | 1.5 | 70 | 107 | 0.29 | 0.016 | Inv. |
| 132 | 32 | Polyvinyl butyral C | —COOH | $5.3 \times 10^{-5}$ | 1.5 | 67 | 104 | 0.27 | 0.019 | Inv. |
| 133 | 33 | Polyvinyl butyral D | —PO(OH)$_2$ | $5.3 \times 10^{-5}$ | 1.5 | 68 | 106 | 0.28 | 0.015 | Inv. |
| 134 | 34 | Polyvinyl butyral E | —OPO(OH)$_2$ | $5.3 \times 10^{-5}$ | 1.5 | 67 | 105 | 0.27 | 0.016 | Inv. |
| 135 | 35 | Polyvinyl butyral F | — | 0 | 1.5 | 66 | 104 | 0.26 | 0.019 | Inv. |

As can be seen from Tables 3, radiation image converting panels according to the invention were shown to be superior to comparative samples, taking account of brightness, sharpness and graininess in combination.

Example 4

Preparation of mixed phosphor type radiation image converting panel

Stimulable phosphors (BaFBr:Eu) were mixed with a binder, such as polyurethane B, I to M as shown in Table 4, and panel samples were prepared in a manner similar to Example 3. A ratio of binder to stimulable phosphor and a filling ratio of the stimulable phosphor were determined in a manner similar to Example 3.

Furthermore, the stimulable phosphor used in each sample was subjected to particle size measurement in a manner similar to Example 1. The stimulable phosphor particles used in each sample exhibited a particle size distribution having two peaks (peak-A and B), as shown in Table 4, that is, the stimulable phosphor particles of each sample was shown to be comprised of two distictive groups in size distribution. A ratio by weight of the phosphor particle group corresponding to the peak-B to those corresponding to the peak-A (denoted as B/A) was determined from the particle size distribution thereof, based on each peak area. In cases where tails of the two peaks overlap with each other, the peaks are separated by a midpoint between the two peak values and thus, the proportion of each peak can be determined.

Evaluation of the screen

The panel samples were evaluated in the same manner as in Example 3. Results thereof were shown in Table 4.

TABLE 4

| Sample No. | Panel No. | Phosphor Peak-B ($\mu$m) | Phosphor Peak-A ($\mu$m) | B/A | Binder Resin | Binder Polar group | Binder Polar group (mol/g) | Binder/ Phosphor (%) | Filling ratio (%) | Brightness | Sharpness (MTF) | Graininess (RMS) | Remarks |
|---|---|---|---|---|---|---|---|---|---|---|---|---|---|
| 136 | 36 | 10.5 | 3.0 | 76/24 | Polyurethane B | —SO$_3$Na | $5.3 \times 10^{-5}$ | 1.5 | 78 | 123 | 0.29 | 0.013 | Inv. |
| 137 | 37 | 10.5 | 1.1 | 76/24 | Polyurethane B | —SO$_3$Na | $5.3 \times 10^{-5}$ | 1.5 | 80 | 120 | 0.29 | 0.012 | Inv. |
| 138 | 38 | 7.3 | 1.1 | 76/24 | Polyurethane B | —SO$_3$Na | $5.3 \times 10^{-5}$ | 1.5 | 79 | 116 | 0.32 | 0.012 | Inv. |
| 139 | 39 | 18.2 | 1.1 | 76/24 | Polyurethane B | —SO$_3$Na | $5.3 \times 10^{-5}$ | 1.5 | 77 | 126 | 0.31 | 0.014 | Inv. |
| 140 | 40 | 25.8 | 1.1 | 76/24 | Polyurethane B | —SO$_3$Na | $5.3 \times 10^{-5}$ | 1.5 | 78 | 141 | 0.26 | 0.016 | Inv. |
| 141 | 41 | 10.5 | 1.1 | 76/24 | Polyurethane B | —SO$_3$Na | $5.3 \times 10^{-5}$ | 1.5 | 81 | 118 | 0.32 | 0.013 | Inv. |
| 142 | 42 | 10.5 | 1.1 | 98/2 | Polyurethane B | —SO$_3$Na | $5.3 \times 10^{-5}$ | 1.5 | 77 | 124 | 0.29 | 0.015 | Inv. |
| 143 | 43 | 10.5 | 1.1 | 76/24 | Polyurethane I | —OSO$_3$Na | $5.3 \times 10^{-5}$ | 1.5 | 77 | 118 | 0.30 | 0.014 | Inv. |
| 144 | 44 | 10.5 | 1.1 | 76/24 | Polyurethane J | —COOH | $5.3 \times 10^{-5}$ | 1.5 | 76 | 118 | 0.29 | 0.015 | Inv. |
| 145 | 45 | 10.5 | 1.1 | 76/24 | Polyurethane K | —PO(OH)$_2$ | $5.3 \times 10^{-5}$ | 1.5 | 77 | 119 | 0.29 | 0.013 | Inv. |
| 146 | 46 | 10.5 | 1.1 | 76/24 | Polyurethane L | —OPO(OH)$_2$ | $5.3 \times 10^{-5}$ | 1.5 | 78 | 117 | 0.29 | 0.014 | Inv. |
| 147 | 47 | 10.5 | 0.3 | 76/24 | Polyurethane B | —SO$_3$Na | $5.3 \times 10^{-5}$ | 1.5 | 77 | 103 | 0.30 | 0.015 | Inv. |
| 148 | 48 | 10.5 | 4.4 | 76/24 | Polyurethane B | —SO$_3$Na | $5.3 \times 10^{-5}$ | 1.5 | 68 | 123 | 0.25 | 0.014 | Inv. |
| 149 | 49 | 5.2 | 1.1 | 76/24 | Polyurethane B | —SO$_3$Na | $5.3 \times 10^{-5}$ | 1.5 | 68 | 107 | 0.29 | 0.016 | Inv. |
| 150 | 50 | 35.6 | 1.1 | 76/24 | Polyurethane B | —SO$_3$Na | $5.3 \times 10^{-5}$ | 1.5 | 78 | 141 | 0.24 | 0.014 | Inv. |
| 151 | 51 | 10.5 | 1.1 | 78/72 | Polyurethane B | —SO$_3$Na | $5.3 \times 10^{-5}$ | 1.5 | 71 | 113 | 0.26 | 0.015 | Inv. |
| 152 | 52 | 10.5 | 1.1 | 98/2 | Polyurethane B | —SO$_3$Na | $5.3 \times 10^{-5}$ | 1.5 | 68 | 109 | 0.27 | 0.013 | Inv. |
| 153 | 53 | 10.5 | 1.1 | 10/90 | Polyurethane B | —SO$_3$Na | $5.3 \times 10^{-5}$ | 1.5 | 67 | 103 | 0.26 | 0.018 | Inv. |
| 154 | 54 | 7.2 | 4.4 | 76/24 | Polyurethane B | —SO$_3$Na | $5.3 \times 10^{-5}$ | 1.5 | 70 | 111 | 0.28 | 0.015 | Inv. |
| 155 | 55 | 10.5 | 1.1 | 76/24 | Polyurethane M | — | 0 | 1.5 | 63 | 103 | 0.20 | 0.018 | Comp. |

As can be seen from Table 4, radiation image converting panel samples according to the invention were shown to be superior to comparative samples, taking account of brightnes, sharpness and graininess in combination.

What is claimed is:

1. A radiation image detective sheet comprising a support having thereon a luminescent substance layer containing particles of a luminescent substance and a binder containing a hydrophilic polar group, wherein a ratio of said binder to said luminescent substance contained in said luminescent substance layer is 0.1 to 3.0w by weight and a filling ratio of said luminescent substance in said luminescent substance layer is not less than 65%.

2. The radiation image detective sheet of claim 1, wherein said luminescent substance comprises two or more distinctive particle size distributions with two or more peaks including two main peaks A and B; said peak A being at a size of 0.5 to 5 $\mu$m and said peak B being at a size of 6 to 30 $\mu$m, and a difference in size between peak A and peak B being not less than 5 $\mu$m.

3. The radiation image detective sheet of claim 2, wherein a ratio by weight of the luminescent substance particle size corresponding to peak A to that corresponding to peak B is between 5:95 and 80:20.

4. The radiation detective image sheet of claim 1, wherein said binder comprises a resin.

5. The radiation image detective sheet of claim 4, wherein a weight-averaged molecular weight of said resin is 5,000 to 200,000.

6. The radiation image detective sheet of claim 4, wherein said resin containing the hydrophilic polar group is a resin selected from the group consisting of polyurethanes, polyesters, polyvinyl chlorides, polyvinyl butyrals and nitrocelluloses.

7. The radiation image detective sheet of claim 1, wherein said hydrophilic polar group is selected from the group consisting of —SO$_3$M, —OSO$_3$M, —COOM, —PO(OM)$_2$ and —OPO(OM)$_2$ in which M is a hydrogen atom or an alkali metal atom.

8. The radiation image detective sheet of claim 7, wherein the content of said hydrophilic polar group is $10^{-7}$ to $10^{-3}$ mol per g of the binder.

9. The radiation image detective sheet of claim 1, wherein said radiation image detective sheet is a radiographic intensifying screen, said luminescent substance being a phosphor.

10. The radiation detective sheet of claim 1, wherein said radiation detective sheet is a radiation image converting panel, said luminescent substance being a stimulable phosphor.

11. The radiation image detective sheet of claim 1, wherein said luminescent substance comprises two or more distinctive groups in particle size distributions with two or more peaks including two main peaks A and B; said peak A being at a size of 0.5 to 5 $\mu$m and said peak B being at a size of 6 to 30 $\mu$m, and the particle size of peak B being not less than 3 times that of peak A.

12. The radiation image detective sheet of claim 1 wherein the content of said hydrophilic polar group is $10^{-7}$ to $10^{-3}$ mol per gram of the binder.

* * * * *